(No Model.)
J. M. GOLDSMITH.
VALVE.
No. 291,506.  Patented Jan. 8, 1884.
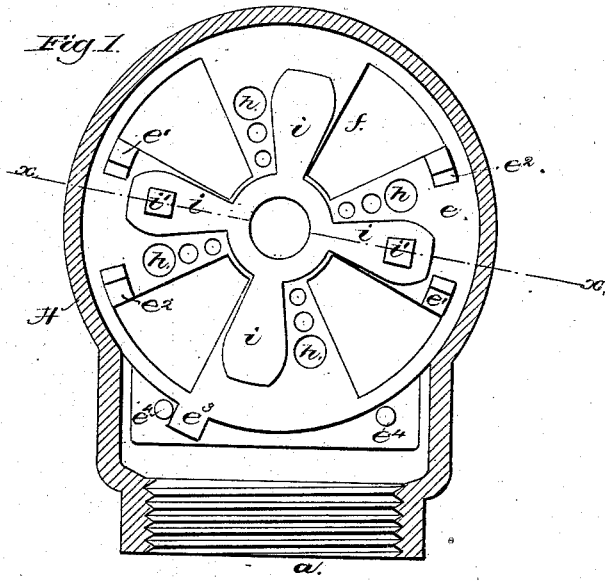
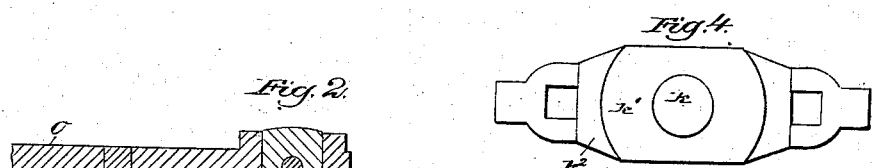
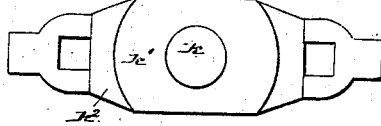
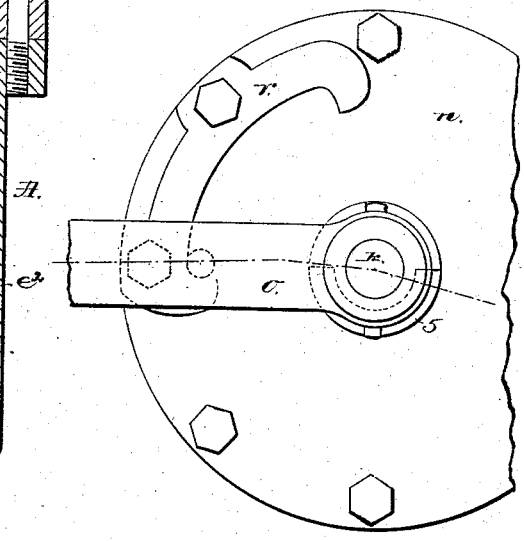
Witnesses.
John F. C. Prinkert
Fred A. Powell
Inventor:
J. Mortimer Goldsmith.
by Crosby & Gregory
attys.

UNITED STATES PATENT OFFICE.

J. MORTIMER GOLDSMITH, OF BOSTON, MASSACHUSETTS.

VALVE.

SPECIFICATION forming part of Letters Patent No. 291,506, dated January 8, 1884.

Application filed February 26, 1883. (No model.)

*To all whom it may concern:*

Be it known that I, J. MORTIMER GOLDSMITH, of Boston, county of Suffolk, State of Massachusetts, have invented an Improvement in Valves, of which the following description, in connection with the accompanying drawings, is a specification, like letters on the drawings representing like parts.

My invention relating to valves is embodied in a valve similar in operation to one shown and described in Letters Patent No. 261,547, granted to me July 25, 1882, to which reference may be had. In the said patent a globe-valve was shown in which the partition or diaphragm separating the inlet and outlet passages is provided with one or more ports or openings, and the valve has corresponding openings, which may, by a sliding rotary movement of the valve, be brought into or moved from coincidence with the said ports of the seat, to permit or arrest the flow of the fluid. The valve-stem is provided with a flange or shoulder working on a seat at the inner end of the valve-stem socket, and the connection between the part of the valve-stem provided with the said shoulder, and the valve is such that the said shoulder and valve may be pressed in opposite directions against their corresponding seats by a spring interposed between them, as well as by the pressure of the fluid the flow of which the valve is to control. It will be seen that in such construction when a valve of considerable area is employed the pressure of the fluid upon it when closed is very considerable, thus causing great friction between it and its seat, and making it very difficult to move the valve.

The present invention has for one of its objects to overcome this difficulty; and it consists in providing the main valve with one or more secondary or relief ports or openings, which, when the said valve is closed, communicate with the ports of the valve-seat; and I provide a secondary valve seated upon the main valve and controlling the said relief-ports therein. The connection of the valve-stem with the secondary and main valves is such that in opening the valve the secondary valve is first moved to uncover the relief-ports through the main valve, thus permitting the fluid to flow through and relieve the pressure upon the main valve, which is subsequently engaged in the further movement of the valve-stem, and opened to afford the maximum passage for the fluid.

The invention also consists in details of construction hereinafter to be described.

Figure 1 is a horizontal section through the upper or inlet portion of a valve embodying this invention; Fig. 2, a vertical section thereof on line $x\ x$, Fig. 1; Fig. 3, a plan view of the top of the valve, showing its bonnet and the end of the valve-stem and the actuating lever or handle therefor; and Fig. 4, a plan view of the valve-stem detached.

The valve casing or chamber A is provided with an inlet-opening, $a$, in its upper part and an outlet-opening, $b$, in its lower part, separated by a partition, $c$, having a face or seat, $c'$, of suitable metal, provided with main ports or openings $d$ of somewhat less than half its area, controlled by the main valve $e$, having a series of main openings, $f$, corresponding in size and shape with the said openings $d$, so that by the rotary sliding movement of the valve $e$ on the seat $c$ the said openings $f$ may be brought into coincidence with the ports $d$, to permit the fluid to flow; or the solid portion of the valve $e$ may be brought over the said ports $d$, to arrest the flow of the fluid. The said valve $e$ is also provided with a series of small secondary or relief ports or openings, $h$, which, when the said main valve is closed, stand over the ports $d$, as shown in Fig. 2, in position to permit the fluid to pass from the inlet to the outlet opening of the valve, if the said openings $h$ are uncovered. These openings $h$ are controlled by a secondary or auxiliary valve, $i$, having much less area to be pressed upon by the fluid above it than the main valve $e$, the said secondary valve covering the openings $h$ when desired to wholly close the valve and prevent the passage of any fluid through it. The valve-stem $k$, passing through the tubular socket $m$ in the cap or bonnet $n$ of the valve, has a shoulder or flange, $k'$, fitted to a seat, 3, at the end of the said socket $m$, and is provided with arms $k^2$, engaging lugs or ears $i'$ on the secondary valve $i$, so that the said valve $i$ is positively moved by the said stem, which, with its handle or lever, constitutes the valve-actuating mechanism. The end of the valve-stem passes into openings at the center of the main and secondary valves, and thus serves as a spindle for their rotary movement, although the said valves are free to move longitudinally on the said stem, the lugs $i'$ being long enough to permit a considerable longitudinal movement without disengagement from the arms $k^2$. A spring, $m'$, interposed between the valve $i$ and shoulder $k'$ of the valve-stem, tends to press the main and secondary valves and the said shoulder $k'$ to their respective seats, and the lugs $i'$ are shown as provided with pins $i^2$, to prevent the spring $m$ from throwing the said valve $i$ off from its stem in case the said stem, valve, and spring are detached from the other parts of the valve. The ends of the arms $k^2$ of the valve-stem project between upright actuating lugs or projections $e'$ $e^2$ on the main valve $e$, so that after the valve-stem has moved the secondary valve $i$ sufficiently to uncover the relief-ports $h$, and thus reduce the pressure on the main valve, the said arms $k^2$ will engage the main valve by the lugs $e'$ and turn it on its seat, to uncover the main ports $d$ and open the valve. In the return movement the secondary valve $i$ will usually be first moved to cover the ports $h$, after which the projections $e^2$ of the main valve will be engaged by the arms $k^2$ of the valve-stem, to close the said main valve. The movement of the main valve in either direction is limited by the stop projection $e^3$ upon the said valve engaging stops $e^4$, connected with the main portion $A$ of the valve, so that in case the friction between the valves $i$ and $e$ should be greater than that between the latter and its seat $c'$, the said main valve $e$ would not be carried beyond the proper point. The valve-stem $k$ is provided with an actuating-lever, $o$, having a foot, $p$, on the upper surface of the bonnet $n$ of the valve, engaged by a stopping device, $r$, limiting its movement in either direction when the valve has been properly opened and closed.

The upper end of the socket $m$ of the valve-stem may also be recessed, as shown at 5, and the hub of the lever $o$ provided with a projection, 6, which by its engagement with the shoulders formed at the end of the said recess 5 will properly limit the movement of the valve-stem. It will be seen that the secondary valve may itself engage the main valve at the end of its movement thereon, instead of having the arms $k^2$ of the valve-stem engage the said main valve, the essential feature of this part of the invention being that there is sufficient lost motion in the connection between the main valve and the secondary valve and stem to permit the said secondary valve to open or close the relief-ports in the main valve before the latter is positively engaged and moved. The pressure on the secondary valve is comparatively small, owing to its small area, so that it can be easily moved, and when thus moved the pressure on the main valve will be reduced, and in most cases the pressure will be nearly equalized above and below it, so that it will move with perfect freedom.

The herein-described construction affords a gradual opening for the passage of fluid, thus rendering it desirable as a throttle-valve for steam-engines.

The means employed for connecting the valve-stem and valves is simple and efficient, and may be employed advantageously for valves of smaller size, in which the relief-ports and secondary valve are omitted.

I claim—

1. The valve-seat provided with ports, and the main valve controlling the said ports, and itself provided with relief-ports, combined with the secondary valve controlling the said relief-ports, and the actuating mechanism for the said main and secondary valves, whereby the latter is operated to relieve the pressure on the main valve prior to the movement of the said main valve, substantially as described.

2. The valve-seat, the main valve provided with relief-ports seated thereon, and the secondary valve combined with the valve-stem, having a shoulder seated at the end of its socket, the said valve-stem being connected with the secondary valve to move it positively, and the main valve being engaged after the secondary valve is moved over the relief-ports of the said main valve, substantially as and for the purpose described.

3. The valve-seat, and main valve thereon, provided with relief-ports and actuating projections, combined with the secondary valve seated on the main valve, and controlling the relief-ports thereof, and the valve-stem, provided with arms connected with the secondary valve, and adapted to engage the actuating projections of the main valve, substantially as and for the purpose described.

4. The valve-seat, the main valve thereon, and secondary valve seated on the main valve, combined with mechanism for actuating the said valves as described, and a stopping device for the main valve, whereby it is positively stopped in a definite position relative to the ports controlled by it, substantially as described.

5. The valve-seat and main and secondary valves, combined with the valve-stem having a projection or shoulder seated upon its socket, and the spring whereby both the said valves and the said shoulder are pressed against their respective seats, substantially as described.

6. The valve-stem, provided with a shoulder or projection seated at the end of its socket, and with valve-actuating arms, combined with the valve longitudinally movable on the said stem, and provided with lugs or projections engaged by the shoulder of the said arms, and operated thereby on a seat opposite to that of the valve-stem, substantially as described.

In testimony whereof I have signed my name to this specification in the presence of two subscribing witnesses.

J. MORTIMER GOLDSMITH.

Witnesses:
JOS. P. LIVERMORE,
FRED A. POWELL.